(12) United States Patent
Matsuda

(10) Patent No.: US 7,032,961 B2
(45) Date of Patent: Apr. 25, 2006

(54) FRAME STRUCTURE FOR VEHICLE

(75) Inventor: Hiroyuki Matsuda, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/962,710

(22) Filed: Oct. 13, 2004

(65) Prior Publication Data
US 2005/0077756 A1 Apr. 14, 2005

(30) Foreign Application Priority Data
Oct. 14, 2003 (JP) .............................. 2003-353946

(51) Int. Cl.
*B62D 25/20* (2006.01)
(52) U.S. Cl. .................................. 296/204; 296/187.11
(58) Field of Classification Search ................ 296/204, 296/187.03, 187.1, 187.11
See application file for complete search history.

(56) References Cited

U.S. PATENT DOCUMENTS

| 4,045,075 A | * | 8/1977 | Pulver .......................... 296/205 |
| 5,259,661 A | * | 11/1993 | Thum ........................... 296/204 |
| 5,466,005 A | * | 11/1995 | Kohlmeier et al. .......... 280/781 |
| 6,619,730 B1 | * | 9/2003 | Porner ......................... 296/204 |

FOREIGN PATENT DOCUMENTS

JP 11-101420 4/1999

* cited by examiner

*Primary Examiner*—Dennis H. Pedder
(74) *Attorney, Agent, or Firm*—McGinn IP Law Group, PLLC

(57) ABSTRACT

A pair of diagonal members are arranged to extend from a substantially central position of a rear end panel extending in a widthwise direction of a vehicle body toward respective junctions of rear frames and a cross member. An end of each of the diagonal members is jointed to the rear end panel, and the other end thereof is jointed to the rear frame together with an end of the cross member. In addition, a guard block protruding toward a bumper beam is detachably fixed to the substantially central position of the rear end panel. Thus, such a frame structure for a vehicle can disperse and absorb an impact load in a low-speed crash or an offset crash.

4 Claims, 5 Drawing Sheets

FRAME STRUCTURE FOR VEHICLE

BACKGROUND OF THE INVENTION

This invention relates to a frame structure for a vehicle.

The present application claims priority from Japanese Patent Application No. 2003-353946, the disclosure of which is incorporated herein by reference.

Conventionally, as shown in FIG. 4, rear side frames (hereinafter referred to as rear frames) 1 and 1' disposed on both right and left sides of a vehicle body have been connected to each other through a cross member 2 which extends in a widthwise direction of the vehicle body below a rear floor, and have been configured to maintain a strength for supporting a bumper beam 5 fixed in a cantilever manner through a rear end panel 3 and through bumper stays 4 and 4' and to maintain a rigidity of the vehicle body.

Incidentally, in this conventional frame structure, an impact load applied from a back side of the vehicle body to the bumper beam 5 due to a crash, for example, is transmitted through the bumper stays 4 and 4' to the respective rear frames 1 and 1' at a front side thereof. Accordingly, in order to avoid damages to the vehicle body in a low-speed rear crash at a speed of 8 km/h (about 5 mph), for instance, it is necessary to increase not only the strength of the bumper stays 4 and 4' and the bumper beam 5 against the impact load from the back side, but also the rigidity (strength) of the rear frames 1 and 1' in a longitudinal (front-to-back) direction for bearing a reactive force of the bumper beam 5.

In this case, increase in a thickness and a length of the respective members for the rigidity of the rear frames 1 and 1' and the strength of the bumper stays 4 and 4' against the impact load from the back side as well as the bumper beam 5 would result in further adding manufacturing costs and weight thereof.

Moreover, if the rigidity of the rear frames 1 and 1' is increased in the longitudinal direction, the rear frame 1' receiving an impact load in a rear offset crash at 80 km/h (about 50 mph) as shown in FIG. 4, for example, may be bent by a resistant force as indicated with the chain double-dashed line in FIG. 5 instead of an intentional axial crush.

When the rear frame 1' receiving the impact load is bent without collapsing in an axial direction, an absorption of the impact load may not be achieved as designed, whereby an unintentional deformation of the rear floor above the rear frames 1 and 1' may hurt passengers in the vehicle (see, for example, Japanese Patent Application Laid-Open No. Hei 11-101420).

SUMMARY OF THE INVENTION

The present invention has been made to solve the foregoing problems of conventional frame structures for a vehicle. An object of the present invention is to provide a frame structure for the vehicle which can effectively disperse and absorb an impact load in a low-speed crash or an offset crash.

In order to attain the object, a first aspect of the present invention provides the frame structure for the vehicle comprising: side frames disposed on both right and left sides of a vehicle body; a cross member for connecting the side frames to each other; bumper stays for installing a bumper beam; a panel member disposed between ends of the side frames on one side for fitting the bumper stays to the side frames therethrough; and a pair of diagonal members arranged to extend from a substantially central position of the panel member in a widthwise direction of the vehicle body toward junctions of the side frames and the cross member, wherein one end of the diagonal member is jointed to the panel member and the other end of the diagonal member is jointed to the side frame together with an end of the cross member.

A second aspect of the present invention provides the frame structure for the vehicle according to the first aspect, which further includes a convex member protruding toward the bumper beam and detachably fixed to the substantially central position of the panel member.

A third aspect of the present invention provides the frame structure for the vehicle according to the second aspect, in which the convex member has a hat-shaped cross section as seen in a plan view and constitutes a closed cross section when it is fixed to the panel member.

A fourth aspect of the present invention provides the frame structure for the vehicle according to the third aspect, in which a fork member is disposed inside the convex member. Here, the fork member includes two plates each of which extends from an end which is close to the bumper beam toward the one end of the diagonal member.

According to the first aspect of the present invention, the pair of diagonal members are arranged so as to extend from the substantially central position of the panel member toward the junctions of the side frames and the cross member. Moreover, the ends of the diagonal members on one side are jointed to the panel member, and the ends of the diagonal members on the other side are jointed to the side frames together with the ends of the cross member. In this way, an impact load in an offset crash is transmitted to the side frame on the uncrashed side through the diagonal member as well as to the side frame on the crashed side, and is thereby dispersed and absorbed. Accordingly, it is possible to optimize the rigidity of the side frames in the longitudinal direction in the offset crash so as to modify a deformation mode of the side frame from a bent mode to an axial crush mode. As a result, the deformation of the vehicle body in the crash is stabilized so as to prevent the deformation of a passenger compartment and to easily rescue a passenger by an improvement in post-crash door operability, thereby improving passenger safety. In addition, even if the optimization of the rigidity causes a degradation in the rigidity of the side frames as compared to conventional side frames, the strength for supporting the bumper beam and the rigidity of the vehicle body are secured by incorporating the diagonal members. Accordingly, the present invention provides an improvement of vehicle safety performance.

According to the second aspect of the present invention, the convex member protruding toward the bumper beam is detachably fixed to the substantially central position of the panel member.

Meanwhile, according to the third aspect of the present invention, the convex member has the hat-shaped cross section in a plan view and constitutes the closed cross section when fixed to the panel member.

Moreover, according to the fourth aspect of the present invention, the fork member including the two plates extending from the end which is close to the bumper beam toward the ends of the diagonal members is disposed inside the convex member.

As a result, an impact load received by the bumper beam in a low-speed crash is dispersed and absorbed by the bumper stays and the convex member. Accordingly, a depressed degree of the vehicle body can be decreased in the low-speed crash. Therefore, it is possible to reduce the strength of the bumper stays and of the bumper beam against the impact load. As a consequence, it is possible to reduce the strength of rear ends of the side frames for supporting the reactive force from the bumper stays and from the bumper beam, and thereby to optimize the rigidity and strength of the side frames in the longitudinal direction. In other words, the rear end of the side frame can be rendered more crushable, and the side frame can be stably deformed in the axial crush mode in the offset crash. As a result, it is possible to reduce the weight and the manufacturing costs by reducing the thickness and the length of the respective members. In addition, as the convex member is detachably fixed to the panel member, it is easy to replace the deformed convex member after the crash, and thus a repair cost can be reduced as well. Incidentally, although the more easily crushable rear end of the side frame may decrease a crash energy absorption, such a defect can be fully compensated by providing the diagonal members.

As a result, it is possible to provide a frame structure for the vehicle which can effectively disperse and absorb the impact load in the low-speed crash or the offset crash.

BRIEF DESCRIPTION OF THE DRAWINGS

These and other objects and advantages of the present invention will become understood from following descriptions with reference to accompanying drawings, wherein.

DETAILED DESCRIPTION OF THE PREFERRED EMBODIMENTS

The present invention realizes a frame structure for a vehicle capable of effectively dispersing and absorbing an impact load in a low-speed crash or an offset crash by providing a pair of diagonal members and a convex member.

Figure 1:
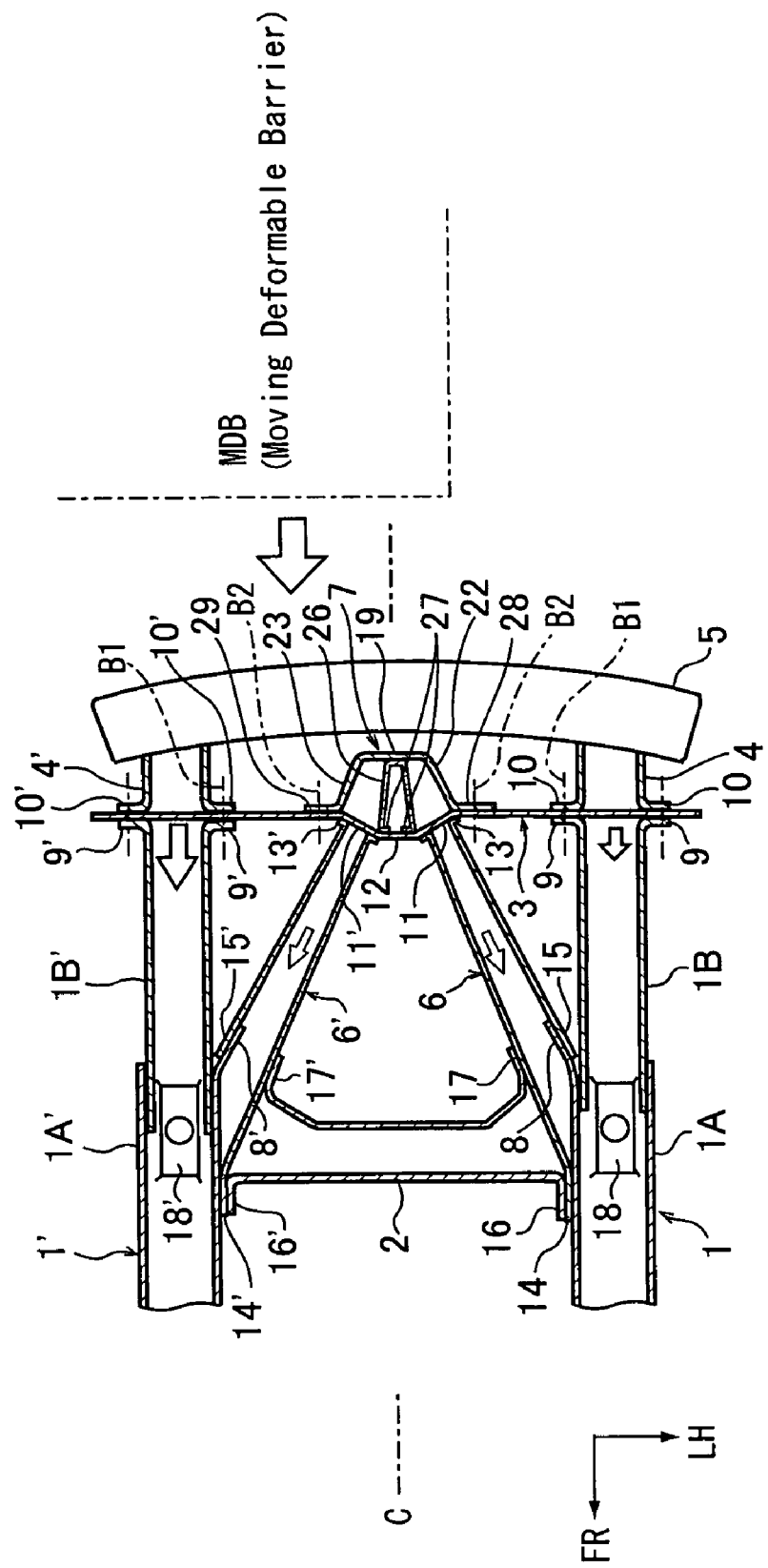
FIG. 1 is a plan view showing an embodiment in which the present invention is applied to a rear frame structure for a vehicle.
Figure 2:
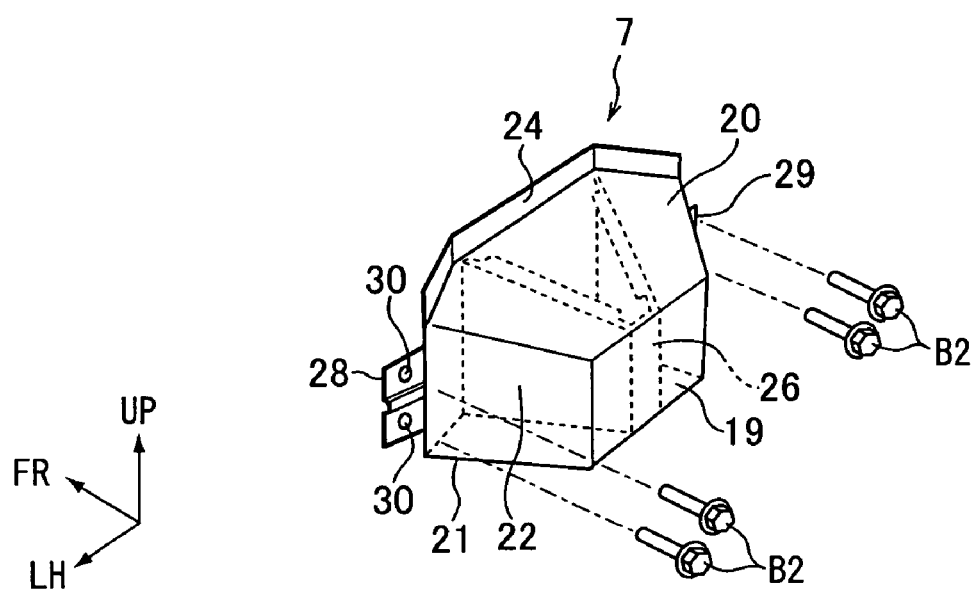
FIG. 2 is a perspective view of a convex member as shown in FIG. 1.
Figure 3:
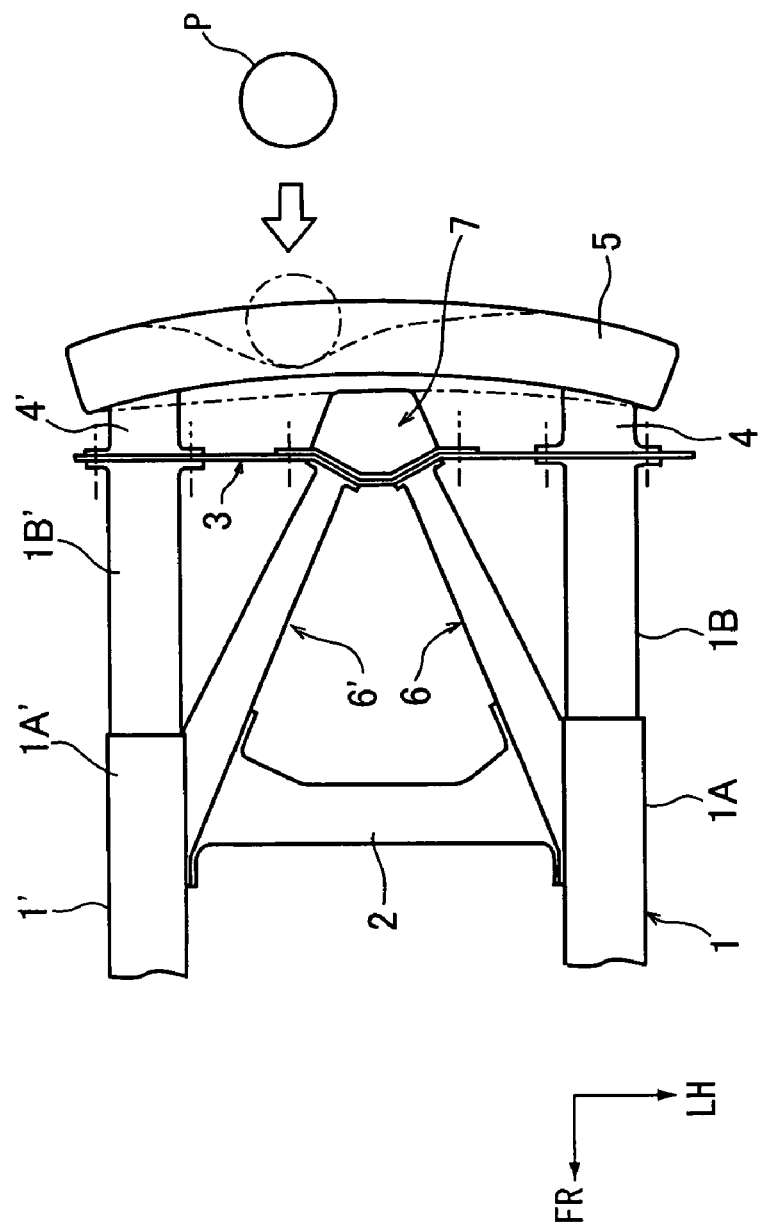
FIG. 3 is a plan view for explaining a low-speed rear crash.
Figure 4:
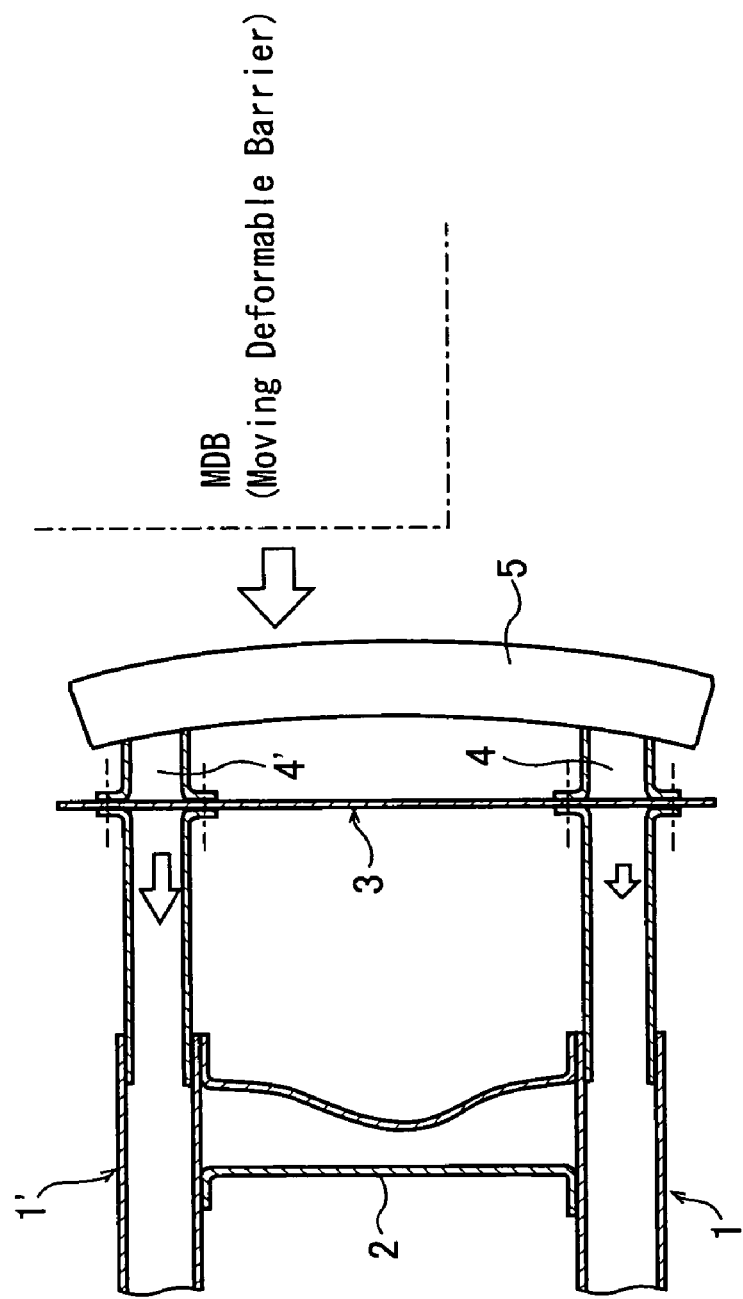
FIG. 4 is a plan view showing a rear frame structure as an example of a conventional frame structure for the vehicle.
Figure 5:
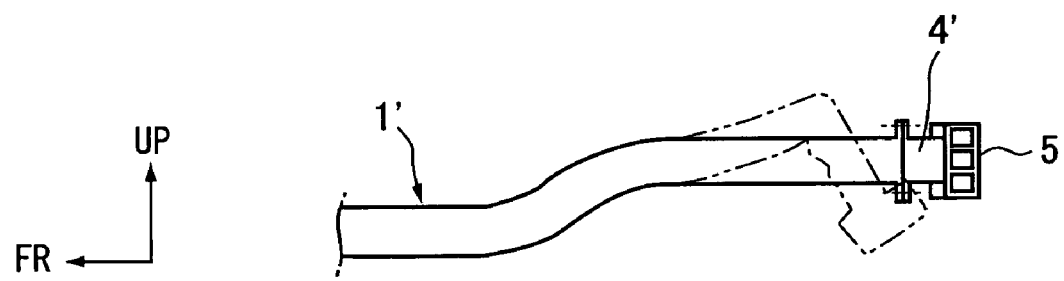
FIG. 5 is a side view showing deformation of the conventional rear frame in a rear offset crash.

An embodiment considered as the most preferred embodiment of the present invention will now be described in detail with reference to FIGS. 1 to 3. FIG. 1 is a plan view showing the embodiment in which the present invention is applied to a rear frame structure for a vehicle. FIG. 2 is a perspective view of a convex member in the embodiment. FIG. 3 is the plan view showing a low-speed rear crash in the embodiment. Constituents in these drawings which are essentially similar to those in the conventional example are designated by the same reference numerals as in the conventional example.

A rear frame structure will be here described according to the present invention. As shown in FIGS. 1 to 3, the rear frame structure includes a pair of diagonal members 6 and 6' which extend from a substantially central position of a rear end panel 3 in a widthwise direction of a vehicle body to junctions of rear frames 1 and 1' and a cross member 2, respectively. Here, the rear end panel 3 functions as a panel member which is disposed between rear ends of the rear frames 1 and 1'. The rear frame structure also includes a convex member (hereinafter referred to as a guard block) 7 which protrudes from the substantially central position of the rear end panel 3 toward a bumper beam 5.

Here, the rear frames 1 and 1' are equally disposed on both right and left sides of the vehicle body. Accordingly, the following description will be made mainly on the rear frame 1 on the left side of the vehicle body. In the FIG. 1, the reference symbol C denotes a center line of the vehicle body.

The rear frame 1 includes first and second rear frames 1A and 1B which are disposed in series. Each of the first and second rear frames 1A and 1B has a longitudinally long rectangular cross section. A front end of the second rear frame 1B is inserted to a rear end of the first rear frame 1A disposed in front thereof, and the rear frames 1A and 1B are jointed and fixed integrally together by welding. In addition, an oblique flange 8 extending toward the substantially central position of the rear end panel 3 is formed by bending at the rear end of the first rear frame 1A.

Meanwhile, flanges 9 extending in a widthwise direction of the vehicle body are formed by bending at a rear end of the rear frame 1 (i.e., on the second rear frame 1B). Flanges 10 are formed on a front end of a bumper stay 4 so as to extend in the widthwise direction. The flanges 10 are jointed to the flanges 9 through the rear end panel 3 by bolts B1 and nuts. In this way, a left end of the bumper beam 5 is supported by the rear end of the rear frame 1 in a cantilever manner.

The rear frame 1' on the right side of the vehicle body has a similar configuration to the rear frame 1 on the left side thereof.

Side faces 11 and 11' and a front face 12 are symmetrically formed in the substantially central position of the rear end panel 3 by bending. The side faces 11 and 11' respectively face junctions of the rear frames 1 and 1' and the cross member 2. The front face 12 is interposed between the side faces 11 and 11' so as to be directed forward. Further, the pair of the diagonal members 6 and 6' on both right and left sides are arranged in an approximately V-shape (a toe-out setting) so as to extend from the side faces 11 and 11' to the junctions of the rear frames 1 and 1' and the cross member 2, respectively.

Here, the diagonal member 6 will be described on behalf of the diagonal members 6 and 6'. The diagonal member 6 has the longitudinally long rectangular cross section, and includes lateral flanges 13 on a rear end thereof. The lateral flanges 13 abut on the left side face 11 and is jointed and fixed thereto by welding. Moreover, a front flange 14 extending to the front of the vehicle body and a rear flange 15 extending along the oblique flange 8 of the first rear frame 1A are formed on a front end of the diagonal member 6. Further, the front flange 14 is jointed and fixed to the first rear frame 1A by welding together with a flange 16 formed on a left end of the cross member 2. Meanwhile, the rear flange 15 is jointed and fixed to the oblique flange 8 by welding. Moreover, an obliquely backward flange 17 formed near the left end of the cross member 2 is jointed and fixed to an inner side face of the diagonal member 6 by welding. As described above, while the cross member 2 is orthogonally jointed to the rear frame 1, the diagonal member 6 is jointed obliquely to the longitudinal direction of the rear frame 1. In this way, the rigidity of the rear frame 1 in the longitudinal direction is scarcely affected.

In addition, a separator 18 as a reinforcing member for supporting unillustrated rear suspension members such as a rear suspension arm or a rear suspension subframe is disposed at the rear frame 1 to which the cross member 2 and the diagonal member 6 are jointed, namely, at the junction of the first and second rear frames 1A and 1B.

The diagonal member 6' on the right side of the vehicle body has a similar configuration to the diagonal member 6 on the left side thereof.

As described above, the diagonal members 6 and 6' are arranged to extend from the central position of the rear end panel 3 toward the junctions of the rear frames 1 and 1' and the cross member 2, respectively. The rear ends of the diagonal members 6 and 6' are jointed to the rear end panel 3, and meanwhile, the front ends of the diagonal members 6 and 6' are jointed to the rear frames 1 and 1' together with the right and left ends of the cross member 2. In this way, as shown in FIG. 1, an impact load in a rear offset crash is transmitted not only to the rear frame 1' on the crashed side but also to the rear frame 1 on the uncrashed side through the diagonal member 6, and is thereby dispersed and absorbed. Accordingly, it is possible to optimize the rigidity of the rear frames 1 and 1' in the longitudinal direction in the rear offset crash by modifying a deformation mode of the rear frames 1 and 1' from a bent mode to an axial crush mode. By optimizing the rigidity of the rear frames 1 and 1' in the longitudinal direction, the deformation of the vehicle body in the rear offset crash is stabilized so as to prevent deformation of a passenger compartment and to facilitate rescue of passengers by an improvement in post-crash door operability, thereby improving passenger safety. In addition, even if the optimization of the rigidity causes degradation in the rigidity of the rear frames 1 and 1' as compared to conventional rear frames, the strength for supporting the bumper beam 5 and the rigidity of the vehicle body are secured by incorporating the diagonal members 6 and 6'. Accordingly, the present invention provides an improvement of a vehicle safety performance.

In addition, the separators 18 and 18' for supporting the rear suspension members are disposed on the junctions on the rear frames 1 and 1' for jointing the cross member 2 and the diagonal members 6 and 6'. Accordingly, the junctions of the first and second rear frames 1A and 1B as well as 1A' and 1B', and the junctions of the cross member 2, the diagonal members 6 and 6', and the rear frames 1 and 1' are reinforced. Therefore, the present invention is capable of not only transmitting the impact load from the diagonal members 6 and 6' to the rear frames 1 and 1', but also adding with a combined function such as supporting the rear suspension subframes.

Now, the guard block 7 will be described. As shown in FIGS. 1 to 3, the guard block 7 protruding toward the bumper beam 5 is detachably fixed to a back face of the rear end panel 3 jointed to the diagonal members 6 and 6'.

The guard block 7 includes a substantially perpendicular counter face 19 facing the bumper beam 5, substantially horizontal upper and lower faces 20 and 21 extending from upper and lower ends of the counter face 19 toward the front of the vehicle body, and side faces 22 and 23 extending obliquely forward from both side ends of the counter face 19 continuously with side edges of the upper and lower faces 20 and 21. In this way, the guard block 7 has a hat-shaped cross section seen in a plan view and constitutes a closed cross section when fixed to the rear end panel 3.

As shown in FIG. 2, contact faces 24 and 25 to be fixed and jointed to the rear end panel 3 upon fixation of the guard block 7 to the rear end panel 3 are formed upward and downward from front ends of the upper and lower faces 20 and 21. Although the downward contact face 25 is not illustrated in FIG. 2, the downward contact face 25 is formed similarly to the upward contact face 24.

In addition, a brace 26 as a fork member for connecting the counter face 19 to the rear ends of the diagonal members 6 and 6' through the rear end panel 3 is disposed inside the guard block 7. The brace 26 is formed into a V-shape in a plan view. A rear end of the brace 26 is either jointed to the counter face 19 or located close to the counter face 19 with a space therebetween. Meanwhile, an upper end of the brace 26 is jointed and fixed to the upper face 20 and a lower end thereof is jointed and fixed to the lower face 21 by welding. In this way, the brace 26 is integrated with the guard block 7. In addition, contact faces 27 (see FIG. 1) to be jointed to the front face 12 of the rear end panel 3 are formed by bending at front ends of the brace 26.

Further, the guard block 7 is fastened to the substantially central position of the rear end panel 3 by using bolts B2, which are inserted through bolt holes 30 provided on flanges 28 and 29 as projected from the side faces 22 and 23, and by using nuts as well. Here, the flanges 28 and 29 may include reinforcements such as beads.

As described above, the guard block 7 protruding toward the bumper beam 5 is fastened to the substantially central position of the rear end panel 3 with the bolts and nuts. In this way, as shown in FIG. 3, an impact load received by the bumper beam 5 in a case of a low-speed rear crash with such an obstacle as a pole P is dispersed and absorbed by the bumper stays 4 and 4' on both right and left sides and by the guard block 7. Accordingly, a degree of depression of the vehicle body is decreased in the low-speed rear crash as compared to the conventional configuration including only the bumper stays 4 and 4'. Thus it is possible to reduce the strength of the bumper stays 4 and 4' and of the bumper beam 5 against the impact load, and to reduce the rigidity of the rear frames 1 and 1' in the longitudinal direction. As a result, it is possible to reduce the weight and the manufacturing costs by reducing the thickness and the length of the respective members. In addition, as the guard block 7 is detachably fixed to the rear end panel 3 with the bolts and nuts, it is easy to replace the deformed guard block 7 after a crash, and a repair cost can be thereby reduced as well.

It is preferable to set the strength of the guard block 7 to an appropriate value so that the guard block 7 is crushable by the impact load caused in the offset rear crash.

Moreover, the present invention is applicable not only to the above-described rear frame structure but also to a front frame structure of a vehicle.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A frame structure for a vehicle, comprising:
   side frames disposed on both right and left sides of a vehicle body;
   a cross member for connecting the side frames to each other;
   bumper stays for installing a bumper beam;
   a panel member disposed between ends of the side frames on one side for fitting the bumper stays to the side frames therethrough; and
   a pair of diagonal members arranged to extend from a substantially central position of the panel member in a widthwise direction of the vehicle body toward junctions of the side frames and the cross member, wherein one end of the diagonal member is jointed to the panel member and the other end of the diagonal member is jointed to the side frame together with an end of the cross member.

2. The frame structure for a vehicle according to claim 1, further comprising:

a convex member protruding toward the bumper beam and detachably fixed to the substantially central position of the panel member.

3. The frame structure for a vehicle according to claim 2, wherein the convex member has a hat-shaped cross section in a plan view and constitutes a closed cross section when it is fixed to the panel member.

4. The frame structure for a vehicle according to claim 3, wherein a fork member is disposed inside the convex member, and includes two plates each of which extends from an end which is close to the bumper beam toward the one end of the diagonal member.

* * * * *